(12) United States Patent
DeSpain et al.

(10) Patent No.: US 7,509,345 B2
(45) Date of Patent: Mar. 24, 2009

(54) METHOD AND SYSTEM FOR PERSISTING AND MANAGING COMPUTER PROGRAM CLIPPINGS

(75) Inventors: Stuart N. DeSpain, Seattle, WA (US); Erik V. Schwiebert, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 360 days.

(21) Appl. No.: 10/956,625

(22) Filed: Sep. 29, 2004

(65) Prior Publication Data

US 2006/0075353 A1    Apr. 6, 2006

(51) Int. Cl.
*G06F 7/00*    (2006.01)

(52) U.S. Cl. .......................... 707/104.1; 707/1

(58) Field of Classification Search .......... 707/2, 707/10, 7, 4, 9, 3, 104.1, 100, 1; 715/770, 715/763; 709/205; 345/810
See application file for complete search history.

(56) References Cited

U.S. PATENT DOCUMENTS

| | | | | |
|---|---|---|---|---|
| 5,321,396 A * | 6/1994 | Lamming et al. | ...... | 340/825.49 |
| 5,752,254 A * | 5/1998 | Sakairi | ...... | 715/530 |
| 6,177,939 B1 * | 1/2001 | Blish et al. | ...... | 715/770 |
| 6,678,698 B2 | 1/2004 | Fredell | | |
| 6,924,827 B1 * | 8/2005 | Gulati et al. | ...... | 715/763 |
| 7,051,036 B2 | 5/2006 | Rosnow | | |
| 7,266,502 B2 | 9/2007 | Robins | | |
| 2002/0016789 A1 * | 2/2002 | Ong | ...... | 707/10 |
| 2003/0046345 A1 | 3/2003 | Wada | | |
| 2003/0076364 A1 * | 4/2003 | Martinez et al. | ...... | 345/810 |
| 2003/0233241 A1 * | 12/2003 | Marsh | ...... | 705/1 |
| 2004/0123242 A1 * | 6/2004 | McKibben et al. | ...... | 715/513 |
| 2004/0150671 A1 * | 8/2004 | Kamiwada et al. | ...... | 345/782 |
| 2004/0226012 A1 * | 11/2004 | Awada et al. | ...... | 718/100 |
| 2005/0069225 A1 * | 3/2005 | Schneider et al. | ...... | 382/305 |
| 2005/0086096 A1 | 4/2005 | Bryant | | |
| 2005/0203935 A1 * | 9/2005 | McArdle | ...... | 707/101 |
| 2005/0240623 A1 | 10/2005 | Kobza | | |
| 2006/0004699 A1 * | 1/2006 | Lehikoinen et al. | ...... | 707/2 |
| 2006/0041589 A1 * | 2/2006 | Helfman et al. | ...... | 707/104.1 |
| 2006/0047752 A1 * | 3/2006 | Hornby | ...... | 709/205 |
| 2006/0047811 A1 | 3/2006 | Lau | | |

OTHER PUBLICATIONS

Office Action dated Jan. 11, 2008 cited in U.S. Appl. No. 10/932,569.
Office Action dated Jul. 3, 2008 cited in U.S. Appl. No. 10/932,569.
Office Action dated Sep. 12, 2008 cited in U.S. Appl. No. 10/932,569.

* cited by examiner

*Primary Examiner*—Charles Rones
*Assistant Examiner*—Fariborz Khoshnoodi
(74) *Attorney, Agent, or Firm*—Workman Nydegger

(57) ABSTRACT

Described is a system and method that provide an organized view of computer content clippings including text, documents, pictures, and other file types. The clippings are persisted with associated metadata that enables the users to access the clippings in a managed manner via filtering and sorting mechanisms that allow the user to view clippings sorted and/or filtered based on the metadata. The metadata includes originating application information, originating document information, and date and size information. The user can assign categories or projects to the clippings to organize various clippings for a future project to be created from the clippings, assign keywords, and give the clipping a title. The present invention thus allows users to maintain a large database of useful clippings that can be reused in different documents.

33 Claims, 10 Drawing Sheets

METHOD AND SYSTEM FOR PERSISTING AND MANAGING COMPUTER PROGRAM CLIPPINGS

FIELD OF THE INVENTION

The invention relates generally to computing systems, and more particularly to data storage on a computer system.

BACKGROUND

Computer users often create documents from a variety of sources, such as text copied from one or more documents, tables copied from spreadsheets, graphic images accessed via another application, and so forth. The user generally arranges these document fragments as desired and edits them as appropriate (which may include adding entirely new information), in order to ultimately produce a final product.

To facilitate such operations, contemporary operating systems and certain application programs each provide a clipboard. In general, a user can cut or copy text and images (clippings) from one source and paste them into a document such as a word processing document or a spreadsheet. While some document-based clipboards preserve multiple clippings, such clipboards are temporary in that when the computer system is re-booted, the clippings are lost. Moreover, typical program clipboards are limited and operate on a first in, first out basis, with no other arrangement provided, whereby the oldest clipping is lost whenever the clipboard is full and another clipping is added. Even clipboards that do not have such limitations still do not allow for other arrangements of the clippings.

For programs having clipboards, when the user changes focus to another program, the most recent clipping is copied to the operating system's clipboard. However the operating system clipboard preserves only the latest clipping, which may then be overwritten by a later clipping from another source, such as content copied from a browser. Although it would be feasible to have the operating system clipboard similarly preserve multiple clippings, the same problems with program clipboards would exist with such an operating system clipboard, namely clippings likewise would be lost upon a re-boot, the oldest clipping would be discarded whenever the clipboard is full and another clipping is added, and/or there is no way to arrange the clippings.

As a result, computer users have implemented their own custom methods for persisting clippings, e.g., dragging clippings to the desktop, creating a document that acts as a depository for clippings, and employing other idiosyncratic methods. While these manual methods work to an extent for some users, what is really needed is an engineered solution for persisting and managing clippings.

SUMMARY OF THE INVENTION

Briefly, the present invention is directed towards a system and method by which a user of various application programs may persist computer clippings comprising scraps and/or files for later access. The later access is managed via sorting and/or filtering, and facilitates pasting persisted clippings into an open document or a clipboard.

A scrapbook component or program persists the clipping data to a database, along with metadata that corresponds to the clipping data. Clipping data may be added to the scrapbook by dragging and dropping a marked scrap selection or a file to an appropriate scrapbook window of a scrapbook user interface, and/or via an "Add" button, via an add to scrapbook command menu command. Clippings are maintained with any flavors that they are posted with, e.g., as rich text, formatted text, unformatted text, Unicode text, and/or various types of graphics formats.

Once added to the scrapbook, the clipping is persisted into the database, and becomes available for pasting into another (or the same) document, along with metadata that describes the clipping, including originating application information, originating document information, and date and size information. The user can assign categories or projects to the clippings to organize various clippings for a future project to be created from the clippings, assign keywords, and give the clipping a title.

Because of the presence of the metadata, users may manage the presentation of the clippings via a management mechanism comprising filter controls and a sort mechanism. The filter controls allow the user to view a subset of the clippings (selected document scraps and data files) as specified by the user in a major field and minor field. The sort control likewise provides managed access to the clippings by letting the user view them in a sorted ordering. The scrapbook also allows users to choose a method for moving clippings from the scrapbook to a document, e.g., to paste as plain text instead of another format.

To facilitate retrieval, clippings are represented with text metadata and graphic thumbnails, and users can also choose the manner in which clipping representations are displayed. A view chooser allows users to view text lists, large thumbnails, or thumb/text combination previews. A "get information" button is provided to allow the user to view some or all of the metadata, e.g., clipping name, date clipped, the source application (if available), size, file name (if available), date created, date modified, and the original file (providing a hyperlink to file if the file path is available). If the user has selected either a project or category as the view filter, any clipping captured is automatically tagged as part of the selected project or category.

Other advantages will become apparent from the following detailed description when taken in conjunction with the drawings, in which:

DETAILED DESCRIPTION

Exemplary Operating Environment

Figure 1:
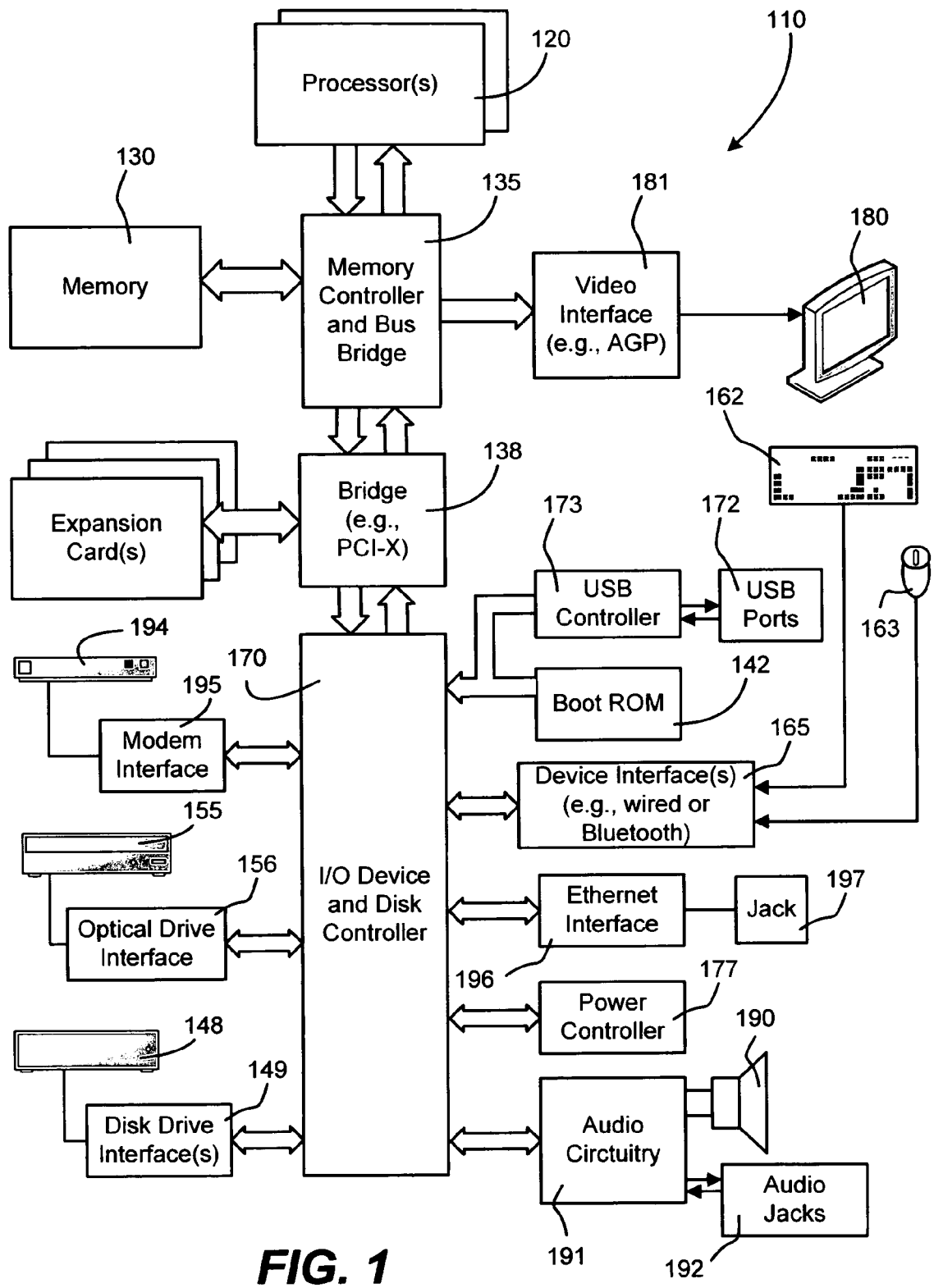
FIG. 1 is a block diagram generally representing a computer system into which the present invention may be incorporated.

FIG. 1 illustrates an example of a suitable computing system environment on which the invention may be implemented. The computing system environment is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120 containing one ore more processors, a system memory 130, and a bus structure (e.g., memory controller/bus bridge) 135 that couples various system components including the system memory to the processing unit 120. The bus structure 135 and/or other bus bridge mechanisms 138 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and/or PCI-X.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data. By way of example, and not limitation, communication media includes wired media such as a wired network or direct-wired connection. Combinations of the any of the above should also be included within the scope of computer-readable media.

The system memory 130 includes computer storage media in the form of volatile and/or nonvolatile memory such as read only memory (ROM) and random access memory (RAM). A boot ROM 142, containing the basic routines that help to transfer information between elements within computer 110, such as during start-up, may be independently coupled to the system, as shown in FIG. 1. The memory typically contains data and/or program modules that are immediately accessible to and/or presently being operated on by the processing unit 120. By way of example, and not limitation, examples include a host operating system, a guest operating system, application programs, other program modules and program data.

The computer 110 may also include other removable/non-removable, volatile/nonvolatile computer storage media. By way of example only, FIG. 1 illustrates a hard disk drive 148 and interface 149 that reads from or writes to non-removable, nonvolatile magnetic media, an optical disk drive 155 and interface 156 that reads from or writes to a removable, non-volatile optical disk such as a CD-ROM or DVD-ROM or other optical media. Other removable/non-removable, volatile/nonvolatile computer storage media that can be used in the exemplary operating environment include, but are not limited to, magnetic tape cassettes, flash memory cards, Universal Serial Bus (USB) drives, digital versatile disks, digital video tape, solid state RAM, solid state ROM, and the like.

The drives and their associated computer storage media, discussed above and illustrated in FIG. 1, provide storage of computer-readable instructions, data structures, program modules and other data for the computer 110. For example, the hard disk drive 148 may store the host and guest operating systems, application programs, other program modules and program data. Note that these components may be the same as or different from those loaded in the memory 130, although they are typically different instances.

A user may enter commands and information into the computer 110 through input devices such as a keyboard 162 and pointing device 163 (e.g., a mouse), and/or via other well-known input means including a tablet, electronic digitizer, microphone, trackball or touch pad. Other input devices not shown in FIG. 1 may include a joystick, game pad, satellite dish, scanner, or the like. These and other input devices are often connected to the processing unit 120 through a wired and/or wireless input interface 165 that is coupled to the system such as via an I/O device and disk controller 170, but may be connected by other interface and bus structures, such as a parallel port, game port or a universal serial bus (USB)

port 172 and its controller 173. Other mechanisms that may be connected to the controller 170 include a power controller 177.

A monitor 180 or other type of display device is also connected to the system bus 121 via an interface, such as a video interface 181. The monitor 180 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 190 connected via audio circuitry 191 and/or audio jacks 192 and/or a printer, which may be connected through an output peripheral interface or the like.

The computer 110 may operate in a networked environment using logical connections to one or more remote computers, which may be a personal computer, a server, a router, a network PC, a peer device or other common network node, and typically includes many or all of the elements described above relative to the computer 110. Such networks include a local area network (LAN) and a wide area network (WAN), which may be accessed via a modem 194 and modem interface 195 and/or an Ethernet interface 196 and jack 197 and/or, but may also include other networks. Such networking environments are commonplace in offices, enterprise-wide computer networks, intranets and the Internet. It will be appreciated that the network connections shown are exemplary and other means of establishing a communications link between the computers may be used.

Persisting and Managing Clippings

The present invention is generally directed towards a system and method by which various application programs and other programs (such as operating system components) may persist clippings for later access, and/or access persisted clippings for pasting into an open document or the like. As will be understood, numerous ways to implement the present invention are feasible, and only some of the alternatives are described herein. For instance, many of the examples herein will be described with reference to a Macintosh-based operating system and architecture, using Microsoft® Office as a suite of application programs that share a common framework library including a clipboard. However, the present invention is not limited to any alternative described herein, nor is it limited to particular architecture, operating environment, platform and/or operating system. Rather, the present invention provides benefits and advantages in computing in general.

Figure 2:
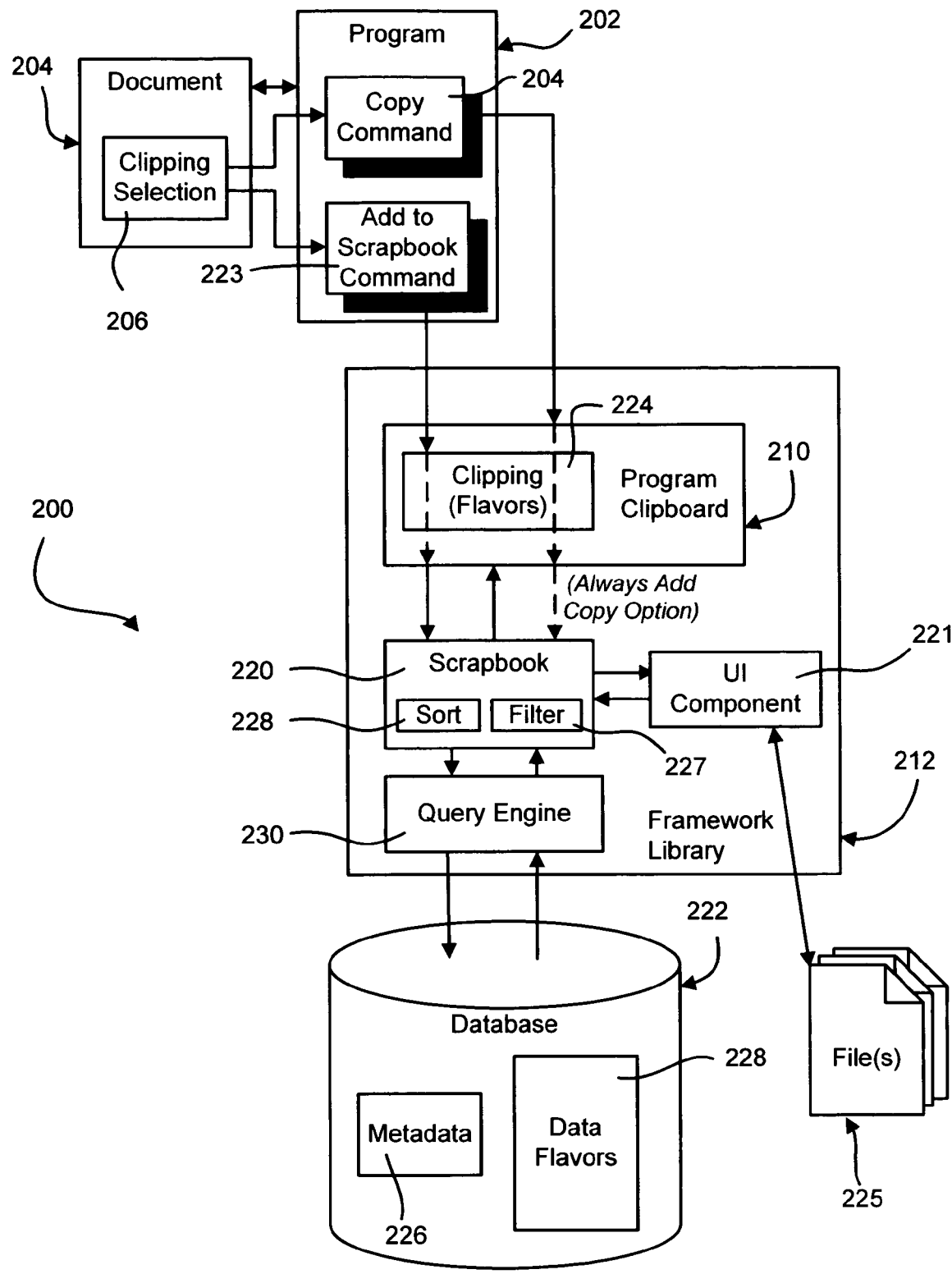
FIG. 2 is a block diagram generally representing an architecture that persists clippings for managed access, in accordance with various aspects of the present invention.

As generally represented in FIG. 2, there is shown an example architecture 200 in which an application program (which may be part of a related suite of application programs) 202 has opened a document 204 and selected some fragment (or possibly all) of the document's contents for clipping, that is, a clipping selection 206 has been marked for possible cutting or copying. The program 202 includes a copy command 208 for copying the selection onto a program clipboard 210, which may be a block of memory that is shared among a suite of related application programs. Note that the copy command is essentially equivalent to the "cut" command with respect to placing a clipping on the clipboard 210, although as is known the cut command removes the marked selection from the document.

In accordance with an aspect of the present invention, in one implementation, a computer user is able to persist the marked clipping selection 206, and have it preserved with metadata that allows the marked clipping 206 to be later accessed in a managed way, including sorting and/or filtering the clippings. As described below, in one implementation this is accomplished via a scrapbook 220 that persists the clipping data to a database 222, along with metadata that corresponds to the clipping data. Note that as used herein, the concept of "adding" something to the scrapbook 220 encompasses the concept of persisting the data in some manner, that is, whatever is being added to the scrapbook is persisted to some suitable data store, even though not necessarily persisted in the scrapbook itself; the database 222 is only one such example of such a data store.

Figure 3:
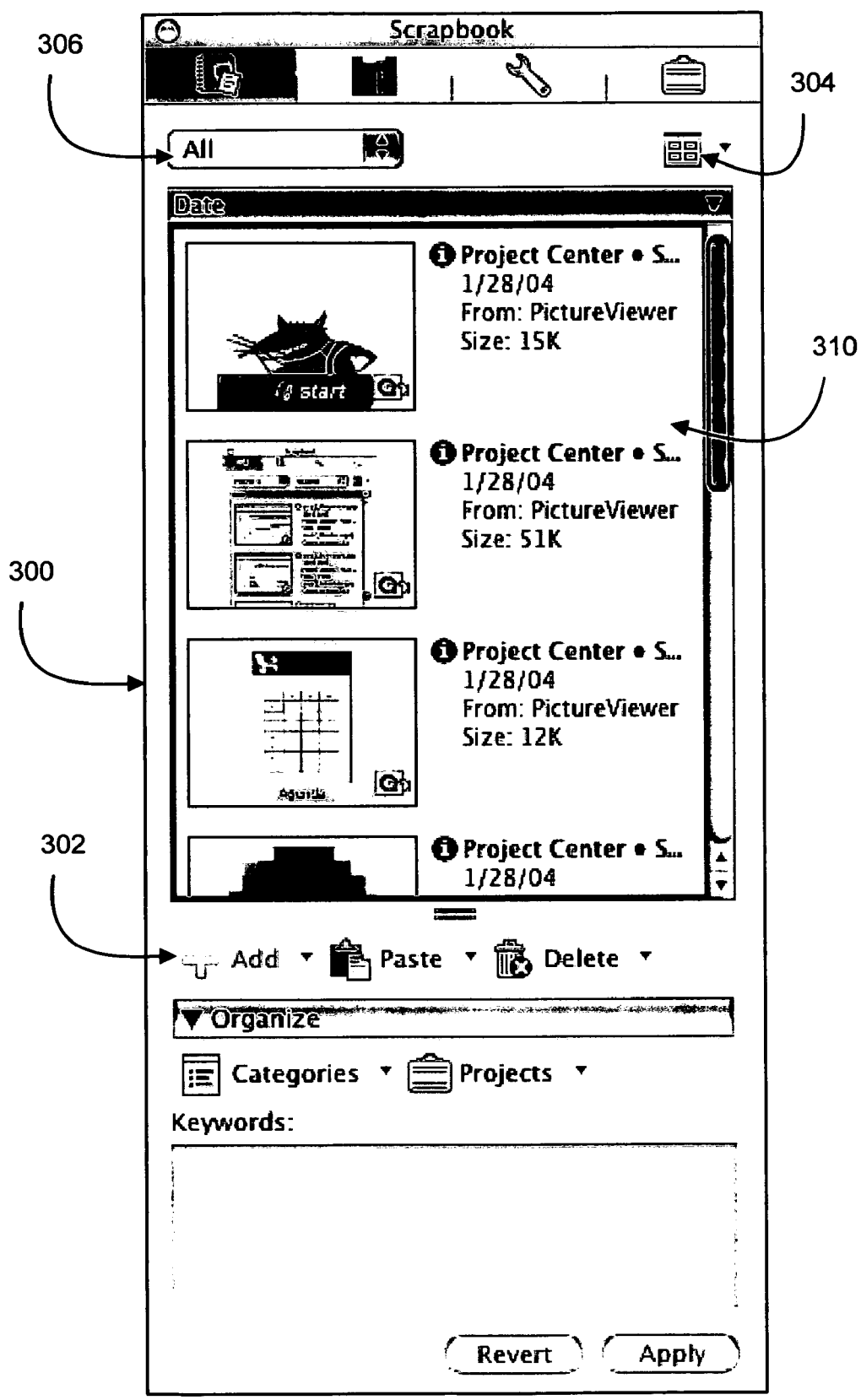
FIG. 3 is a screen shot showing an example of a computer program user interface that provides computer users with access to persisted clippings in a managed way, in accordance with various aspects of the present invention.

In one implementation, clipping data may be added to the scrapbook 220 in various ways, such as by dragging and dropping the marked clipping 206 (or a file, which may also be a clipping) to an appropriate scrapbook window of a scrapbook user interface 221 (FIG. 2). The screenshot 300 of FIG. 3 shows such a window, as well as an "Add" button 302 (FIG. 3) or the like on the scrapbook user interface 221 that may also be used to add a clipping. An add to scrapbook command menu command 223 can be provided in the application program 202, such as a drop down menu and/or an add clipping to the scrapbook icon. Keyboard-based commands also may be used, and it is feasible to have an automated process add clippings to the scrapbook.

In general, the Add button 302 (FIG. 3) in the scrapbook user interface is active whenever some scrap or file is currently selected, and allows a user to add a clipping from the current document selection 406, add a clipping that is currently selected on the application program clipboard 210, or add a supported file or files 225 as a clipping.

In one implementation, any clipping selection added to the scrapbook 220 is automatically copied to the clipboard 210, that is, adding a clipping selection to the scrapbook 220 includes an implied copy command. If the user cuts or copies data in an application when the scrapbook 220 is not active, then the data is placed in the system's clipboard (instead of the scrapbook). Files added to the scrapbook 220 may be treated differently, but may also be copied to the clipboard. Note that conversely, copying a clipping does not by default add the clipping to the scrapbook 220. However, there is a user-configurable "Always Add Copy Option" option, which when set causes the act of copying (or cutting) a clipping 224 to automatically add the clipping to the scrapbook 220, when visible, as represented by the dashed line in FIG. 2 from the copy command through the program clipboard 210 to the scrapbook 220. This option has the disadvantage of likely placing many clippings into the scrapbook 220 that typical users would prefer not be persisted, thereby unnecessarily consuming space and requiring more maintenance, and thus in one implementation is not turned on by default.

Once added to the scrapbook 220, the clipping 224 is persisted into the database 222, and becomes available for pasting into another (or the same) document. Anything that can be copied to the operating system clipboard can be placed on the scrapbook 220.

Clippings are typically posted to the application clipboard 210 and/or operating system clipboard in a variety of formats, referred to as "flavors," e.g., as rich text, formatted text, unformatted text, Unicode text, and/or various types of graphics formats. The flavors posted to the application clipboard 210 are likewise preserved in the scrapbook 220. To this end, the scrapbook 220 stores the flavors of data 229 that are available in the database 222, along with system-generated and any user-defined metadata 226 that describes the data 229. A query engine 230 or the like may be provided for communication with the database 222, but alternatively, database access functionality may be built into the scrapbook component 220.

In the implementation represented in FIG. 2, the scrapbook 220 is shown as being provided in a framework library 212 that includes the other components, thereby providing a mechanism across a suite of applications that allows users to store, organize, and search for clippings, e.g., text, graphics, and OLE objects. The scrapbook 220 supports both drag-and-drop and menu controls to move data to and from documents.

With respect to other data, such as files, a current implementation of the scrapbook supports certain text and graphic files, and future implementations will support other files such as video. In one implementation, the scrapbook recognizes various file types, including GIF, JPG, PICT, PNG, BMP, MacPaint, QT Image, Text and Unicode text, (wherein the above extensions/abbreviations are well-known). The scrapbook is able to reject non-supported file types. To copy files, as represented in FIG. 2 by the set of files 225, users are able to drag supported types of files into the scrapbook user interface component 221 window, such as by dragging or copying a selected file or files from a Finder/Explorer user interface. Users are also able to add specified files (e.g., selected in a Finder/Explorer window) from the scrapbook interface 300 by using the Add button 302. Note that rather than copying the entire file itself, it is feasible that a link to the file may be persisted in the scrapbook 220/database 222, so that, for example, relatively large files such as video movies do not consume double storage space.

As further described below, once stored, because of the presence of the metadata 226, users may manage the data via a management mechanism comprising filter controls 227 and a sort mechanism 228. The filter controls 227 allow the user to view a subset of the clippings (selected document scraps and data files) as specified by the user. The sort control likewise provides managed access to the clippings by letting the user view them in a sorted ordering. The scrapbook 220 also allows users to choose a method for moving clippings from the scrapbook to a document, e.g., to paste as plain text instead of another format.

Figure 4:
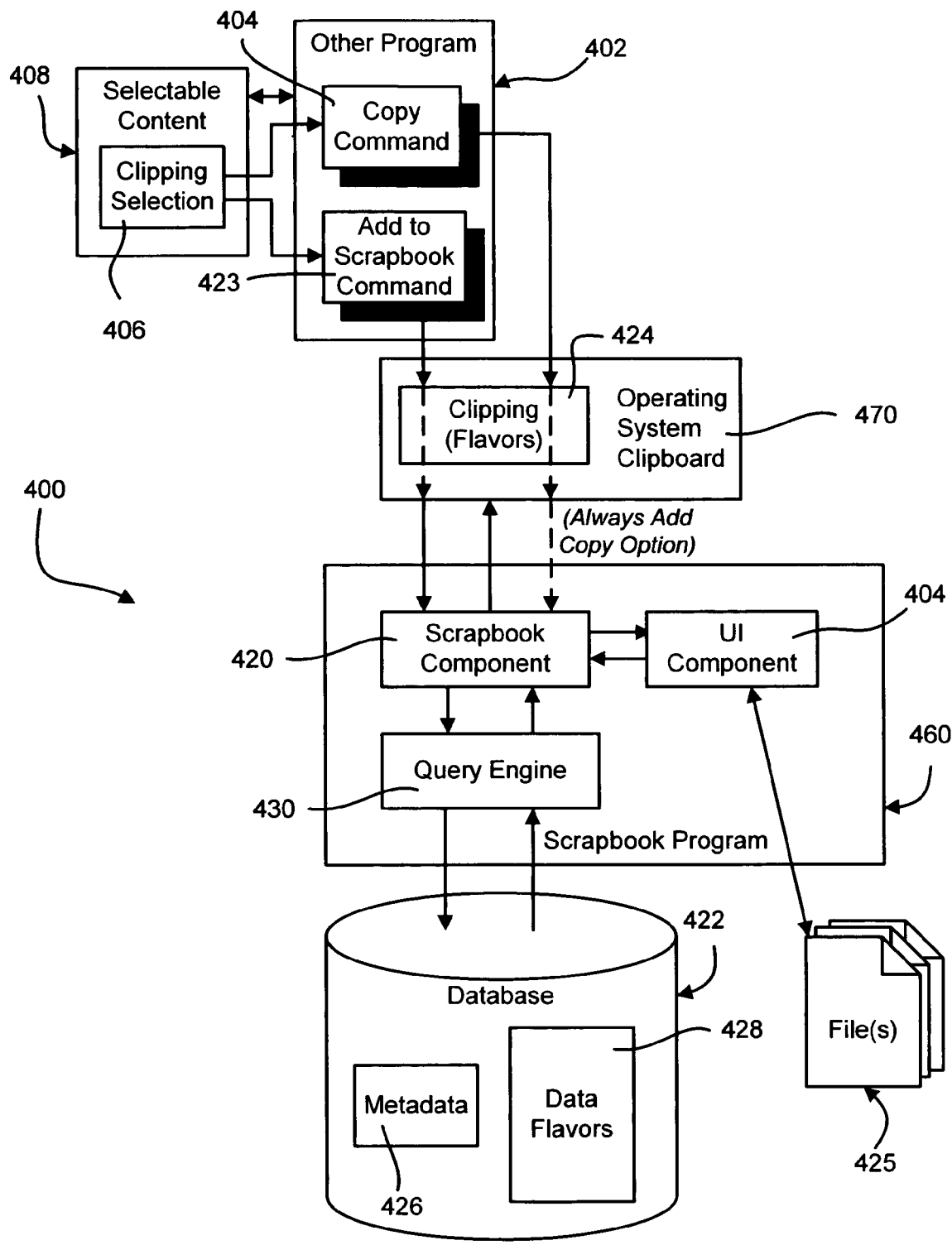
FIG. 4 is a block diagram generally representing an alternative architecture that persists clippings from an operating system clipboard, for managed access in accordance with various aspects of the present invention.

As is understood, the present invention is not limited to a framework library of an application program suite, and/or any particular application program/clipboard. For example, in an alternative representation exemplified in FIG. 4, a scrapbook program 460 may work in conjunction with the operating system clipboard 470 to add clippings such as marked data scraps and files to a database 422 for access via a scrapbook component 420. Any program 402 that has selectable content 408 that can be marked as a clipping selection 406 and can be copied to the operating system clipboard 470 may be added to the scrapbook 420. One or more files 425 similarly may be added.

In such an alternative implementation, the framework library of an application program suite will not necessarily be available, and thus a standalone scrapbook program 460 or the like, including a scrapbook component 420, a user interface component 404 and data store access functionality such as a query engine 430, is provided independent of any application program suite's framework library. Note that if a framework library is also present, some of the modules may be shared with the framework library to avoid redundancy.

Turning to an explanation of various example user interface aspects of the scrapbook, as generally represented in FIG. 3 and FIGS. 5-9, the scrapbook user interface component (e.g., represented as the screenshot 300 of FIG. 3) may be invoked from various interface elements, similar to the way in which the clipboard has heretofore been invoked, that is, by an icon, a menu command and/or a keyboard key combination. The scrapbook is "toggle-based" in that as the user selects the element, visibility toggles between on and off. In one implementation, the scrapbook user interface (e.g., 300 of FIG. 3) is designed to fit relatively small screen resolutions, e.g., as small as 800×600 pixels, however, the clippings section, or panel 310 may be resized vertically, and is scrollable.

In one implementation, the scrapbook 220 is not automatically visible when the user starts an application, but instead depends on the previous state, e.g., if the scrapbook 220 was visible when the user closed the program, the scrapbook 220 is visible when the program is re-launched. In a Microsoft® "Mac:Office" implementation, the scrapbook can be invoked from any open Office application, and may sit alongside other toolbox clients in a tools menu; choosing the menu item launches the toolbox with the scrapbook in focus. Note that certain programs such as Microsoft Corporation's Entourage® program support multiple identities, which allow unique configurations to be stored within one occurrence of the program. When users switch identities, the data associated with the identity (mail database, folder hierarchy, account data, and so forth) is shown. Data from one identity is not available to others. Because the toolbox is not available in Entourage®, the scrapbook may be shown using a palette implementation, described below.

Figure 5:
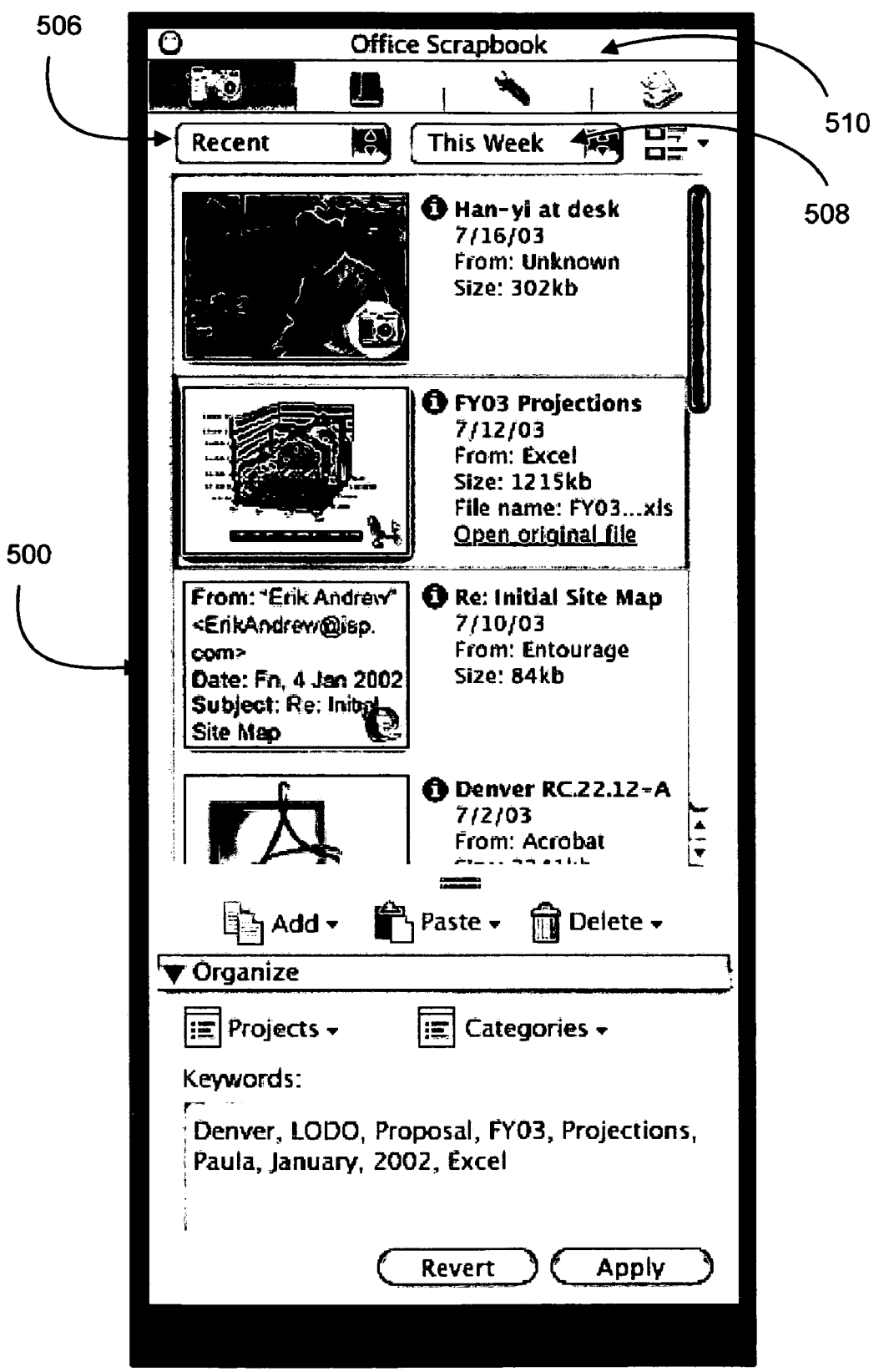
FIG. 5 is a screen shot showing how access to persisted clippings may be managed in a client program, including via a major filter and minor filter in accordance with various aspects of the present invention.

In general, the client implementation, generally represented by the screen shot 500 of FIG. 5, is used when the toolbox is present, and the palette implementation used when the toolbox is not available (as is the case with Entourage®). In appearance, as generally represented by the screen shot 600 of FIG. 6, the palette implementation is essentially identical to the client implementation, except for the absence of toolbox navigational controls (shown in FIG. 5 by the set of controls labeled 510). If the scrapbook is visible as a palette, it will hide when the application is hidden or in the background. In general, the above-described show-hide visibility rules apply regardless of the implementation.

The scrapbook provides essentially the same features whether it is shown as a palette 600 (FIG. 6) or a client-based pane 500 (FIG. 5). Although most of the examples show the client-based design, the various non-toolbox-related controls and arrangements remain the same for both implementations. For example, the clippings panel 310 is used to display the clippings, which may be shown in various formats, as described below. The clippings panel 310 cannot be hidden, essentially because a primary purpose of scrapbook is to provide a representation of the available clippings.

In accordance with another aspect of the present invention, in addition to persisting and showing the available clippings, the scrapbook provides a mechanism that allows users to store, organize, and search for a variety of user-defined clippings and data files to paste into a document. To this end, once copied to the scrapbook, the clippings comprising data scraps and/or files remain permanently persisted (until expressly removed) for pasting into another file. Users are able to copy graphics, movies, plain or styled text, tables, and OLE objects (e.g., charts, graphs, equations) to the scrapbook, and retrieve them based on views, which may be filtered by user-specified criteria.

To facilitate retrieval, clippings are represented with text metadata and graphic thumbnails, and users can also choose the manner in which clipping representations are displayed. A view chooser/filter 304, shown in FIG. 3 in the upper right corner of the scrapbook user interface 300, allows users to view text lists, large thumbnails, or thumb/text combination previews.

In the implementation of FIG. 3 (and similarly in FIGS. 5-7), when selected the view chooser 304 provides a drop down menu that includes a list view option, a detail view option and a large preview option. If the user switches views, any currently selected clipping scrolls into the new view.

In one view, the scrapbook shows thumbnails to represent the clippings, that is, graphic representations of the data stored in the scrapbook 220/database 222. Thumbnails are shown in a scrolling gallery control called the thumbnail browser, and conform to an aspect ratio (e.g., 4:3). As much data is shown as possible, however in the event the thumbnail is too short or too narrow, clippings are center aligned (horizontally and vertically) as necessary. Any unused space is drawn as white. Unlike clipboards, the scrapbook user interface does not show empty clip zones, but rather behaves like a scrollable gallery control and shows nothing.

In the detail view, thumbnails may represent text or graphics clippings, where graphic clippings show a scaled thumbnail of the scrap. The scrapbook thumbnail will, by default, show the richest flavor possible. In order of preference, the flavors recognized are PICT, Unicode text, styled data, regular text, styled data, plain Unicode, plain text and no preview. It should be noted that the application program may specify which flavor is to be shown. More particularly, application programs may place a special flavor on the clip that forces the scrapbook to ignore graphics and render text. This is done to preserve thumbnail quality in some special cases. For example, the title of an image may be more important to show than the image itself. It is also feasible for users to select a preferred flavor for showing from among those that are available.

When text is the preferred flavor specified by the application, text is rendered in the available space, with any wrapping as needed. Rich text formatting (such as bold or color) may be shown when available, although the application may specify the preferred flavor as being plain text or some other format. Files use the generic document icon for that particular type/creator, however when the type/creator is unknown, the generic application program's icon to is instead used to identify the file as being that application program's type.

Figure 6:
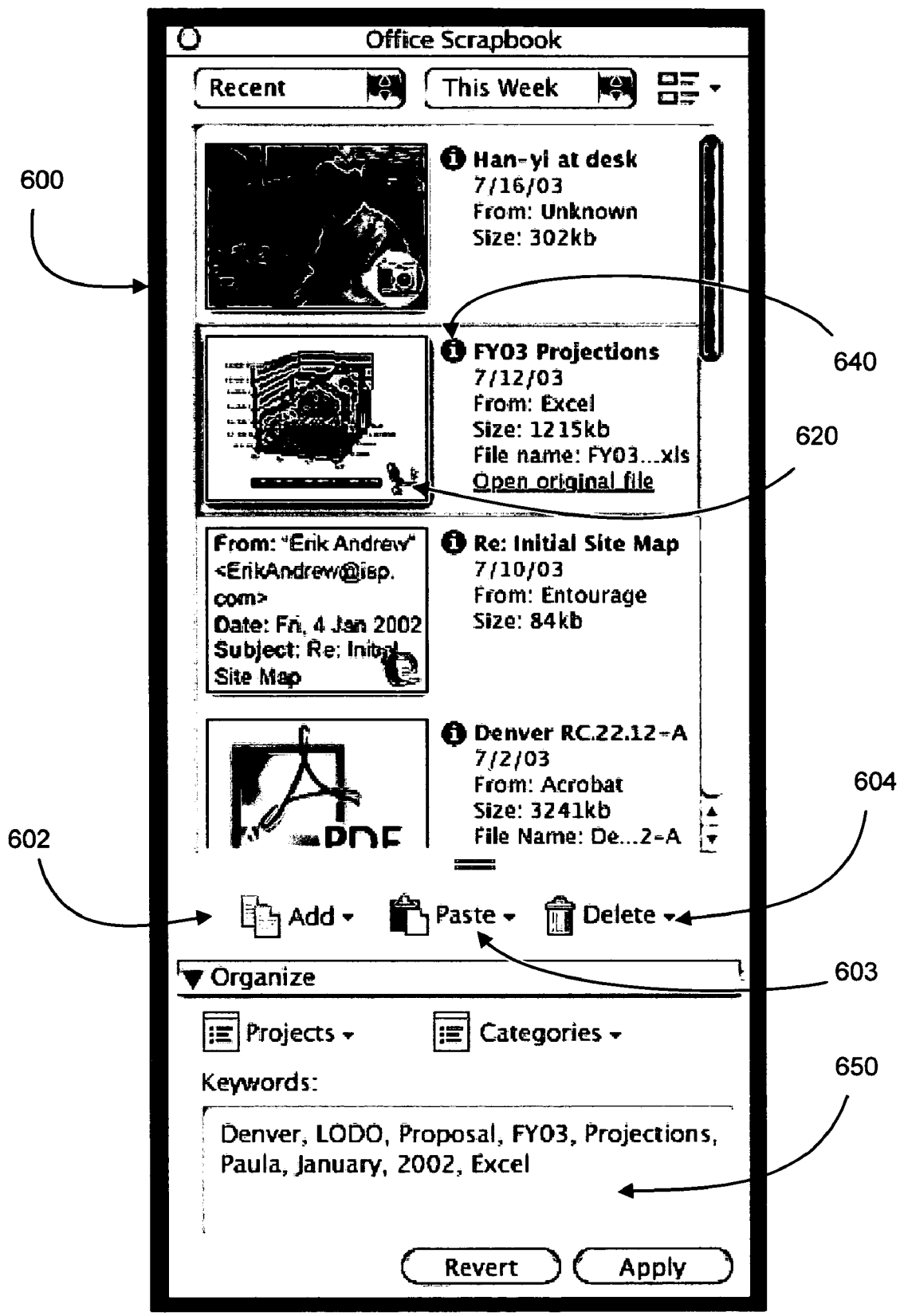
FIG. 6 is a screen shot showing how access to persisted clippings may be managed in a palette program in accordance with various aspects of the present invention.

A badge that indicates the owner/originating application program is stamped on the thumbnail, e.g., in the lower right corner overlaying the graphic representation such as represented in FIG. 6 by the badge labeled 620. Badges are used regardless of source or scrap type, and the badges are pulled from the small system icon (based on creator association). The creator type is included in a unique flavor that at present only Microsoft® Office® applications publish, however other application programs may publish this flavor if desired. If the creator is unknown, a generic "application" icon is used. Note that other special metadata, such as originating application, optimized thumbnails, and file path, are included as special flavors in the copy action when Office applications publish the data flavors; other applications are able to do so as well.

A "get information" button 640 is provided to the right of the clipping title, which when clicked, results in a metadata popup being shown for some period of time (e.g., five seconds) after the click event. If the user clicks on the popup, it will be dismissed immediately. The get information popup shows the metadata-related information, which may include clipping name, date clipped, the source application (if available), size, file name (if available), date created, date modified, and the original file (providing a hyperlink to file if the file path is available. Note that if the linked file cannot be found, the scrapbook does not show the hyperlink.

Figure 7:
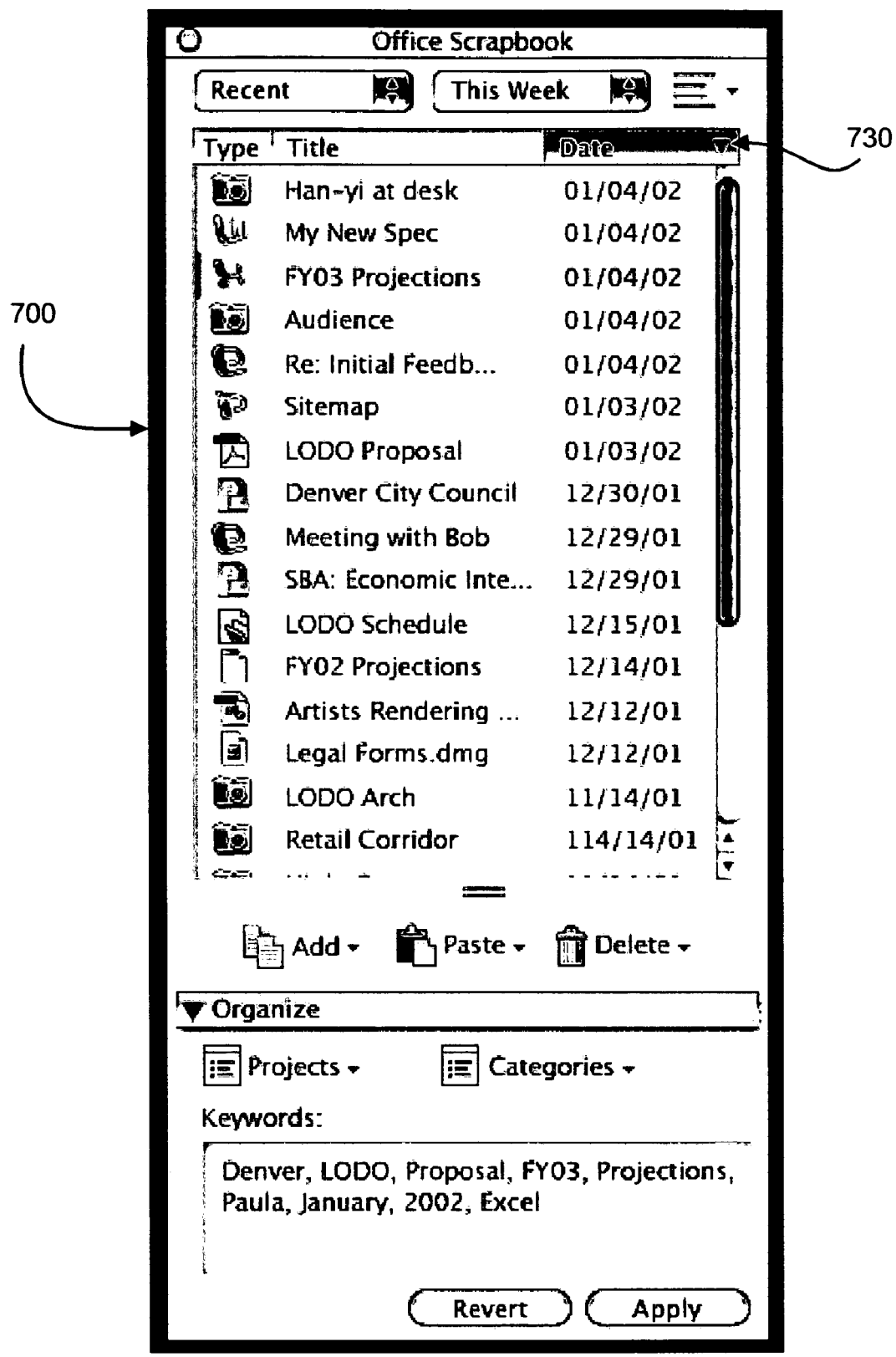
FIG. 7 is a screen shot showing an alternative list view user interface for managing access to persisted clippings in accordance with various aspects of the present invention.

When the user selects the list view from the view chooser 304, as represented by the screenshot 700 in FIG. 7, the scrapbook switches to show a list of type, title and date. The type field identifies the owner/originator application (as determined by the creator), and the title moves to the right of the icon. The scrap capture date (or file date) is shown next to the title. A sorting mechanism, shown by the down arrow 730 in FIG. 7, allows users to sort by a field in ascending or descending order. Users are able to resize the Title and Date columns but not the Type column, and the columns may be sorted in ascending or descending order. When the user switches to either Detail or Large Preview view, the clipping in focus (e.g., the "FY03 Projections" clipping) is shown as being in focus in the other views (e.g., FIG. 6).

In accordance with another aspect of the present invention, metadata is associated with the clippings to allow the user to manage them. When persisted, clippings inherit some metadata, including the clipping date and size. Clippings are initially named based on the originating document when possible, or as "New Clipping" in the event a richer name is unavailable. Users may rename clippings as desired. When available, the clipping is tagged with the originating application and the original file path; the user is thus able to open the original file from the clipping, provided the file is still at that location. Note that when available, the originating application icon will be added to the thumbnail, e.g., as a badge.

Once added to the scrapbook, selected clippings can be tagged with other user-defined metadata, such as to tag selected clippings with keywords. FIG. 6 shows the keywords related to the currently selected clipping, the "FY03 Projections" clipping, in an area labeled 650, wherein keywords are parsed and stored as single, comma delineated words. Keywords are explicitly added by the user, although it is feasible that they be automatically generated. If the selection includes multiple clippings, only common keywords will be displayed. Empty keywords (,"",) and whitespace are removed when parsed.

Users may add, modify, or delete keywords directly in the area (text box) 650, using commas as valid separators, with characters other than commas treated as part of the keyword. Thus, for example, keywords may have spaces in them (e.g., "this is one long keyword"). Duplicate keywords are removed, and are case agnostic. In one implementation, quotation marks and wildcard characters are removed from the keyword. Keywords are stored as a single string in the database 222, sorted in (case-independent) alphabetic order regardless of case. For example, 1001 would come before 72; "Bob" and "bob" would be considered identical. Any new or modified keywords will be alpha-sorted on commit (hitting the "Apply" button).

When multiple clippings are selected, keyword edits are applied to individual clipping keywords. Keywords unique to subsets of the group selection will not be touched, as set forth in the following example:

|  | Clipping A | Clipping B | Clipping C |
| --- | --- | --- | --- |
| Individual Keywords | Dog, Cat, Red, Blue, Dottie | Cat, Bird, Red, Green, Dottie | Cat, Snake, Red, Blue, Green, Dottie |
| Grouped Keywords | Cat, Red, Dottie | | |
| Modified Grouped Keywords | Cats, Red, Clipart | | |

-continued

|  | Clipping A | Clipping B | Clipping C |
|---|---|---|---|
| Modified Individual Keywords | Dog, Cats, Red, Blue, Clipart | Cats, Bird, Red, Green, Clipart | Cats, Snake, Red, Blue, Green, Clipart |

In the above example, when clippings A, B, and C are group selected, they only have three keywords in common (Cat, Red, and Dottie). In this example, the user modifies one keyword (Cat is changed to Cats), deletes another (Dottie), and adds a new keyword (Clipart). After this edit, the individual keywords remain intact, and only the common keyword actions have been applied.

Other metadata includes projects and categories. In general, projects relate various types of otherwise unrelated data items such as email messages, contacts, notes, tasks, folder contents, and, in keeping with the present invention, clippings, to provide centralized access to each project-related item. Categories also relate data items, e.g., instant message data may be kept as a note with a category of instant message to distinguish instant message notes from other notes. In general, a category comprises a criterion that a user may associate with an item of data, including a clipping for filtering as described below. Projects and categories are described in U.S. patent application Ser. No. 10/932,569, filed Sep. 1, 2004, assigned to the assignee of the present invention and herein incorporated by reference.

Figure 8:
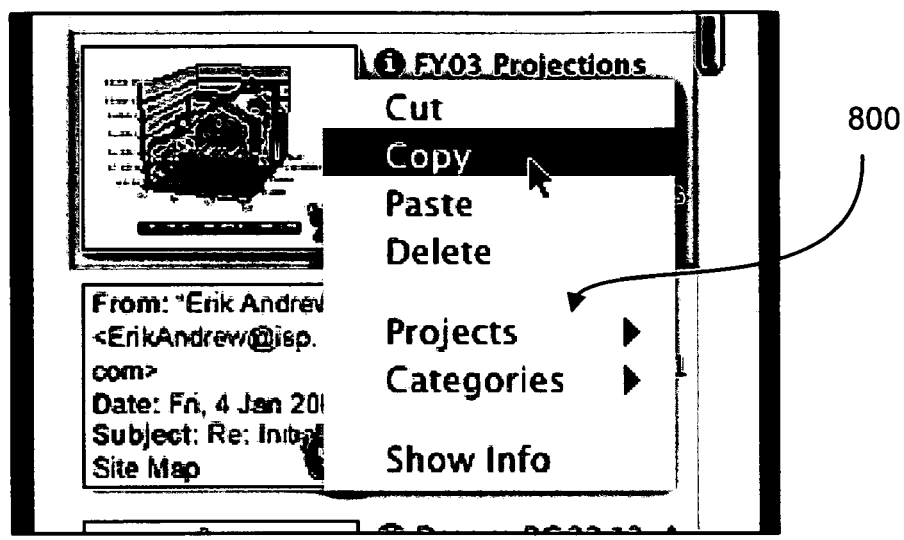
FIG. 8 is a screen shot showing a drop-down menu for working with a persisted clipping in accordance with various aspects of the present invention.
Figure 9:
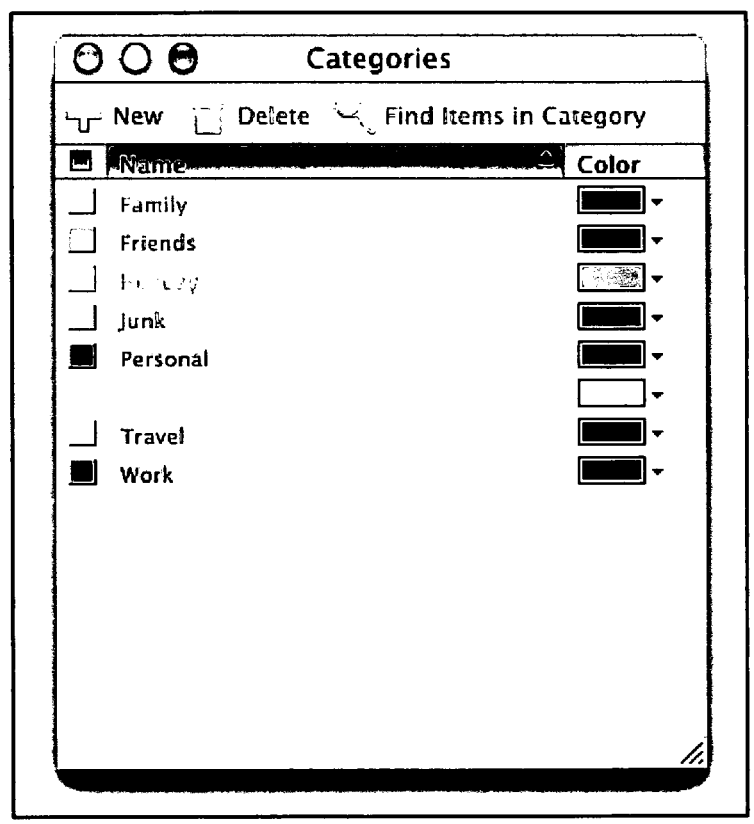
FIG. 9 is a screen shot showing how categories associated with a clipping may be accessed in accordance with various aspects of the present invention.

To associate a clipping with a project and/or category, a user chooses from a drop-down list of available Projects or Categories, e.g., accessed through a menu or the like as represented in the contextual menu 800 of FIG. 8. Once selected, the clipping or clippings will inherit the metadata, with the value shown as a check next to the project or category. The user may then continue to add additional projects and categories by selecting them from the drop down list. If a selected entry is chosen, the project or category association is toggled off. Default categories may be provided, and a user may define custom categories, as generally represented by the various categories represented in FIG. 9. In one implementation, the categories drop down menu has an "Edit Category . . . " as a menu entry, which when selected results in the dialog of FIG. 9 being presented to the user.

The contextual menu of FIG. 8 also shows other commands, including Copy, which copies the current selection to application clipboard, Cut, which copies the current selection to the application clipboard and removes it from the scrapbook, Paste, which inserts the selection into the clipboard (and/or the document), and Delete, which removes the clipping from the scrapbook. As described above, the Projects command provides a submenu enumerating available Projects, with associated projects shown with a check mark. Categories likewise provides a submenu enumerating the available, with associated Categories shown with a check mark. A Show Info command shows the Get Information popup as described above, (although this command is disabled when multiple clippings are selected).

As described above, based on the metadata, a user may use filter controls to view a subset of the available clippings. To this end, a view filter 306 comprising a drop down menu at the top of the Scrapbook interface 300 exposes the following queries (note that FIG. 5 shows both a major filter drop down menu button 506 and a minor filter drop down menu button 508):

| Major Filter | Minor Filter | Description |
|---|---|---|
| All [default] | None (disabled) | shows entire catalog of clippings; this is the default selection |
| Creation date | All [default] | Shows entire catalog of clippings |
|  | Today | shows clippings captured after midnight of the current calendar day |
|  | Last 7 Days | shows clippings captured seven (7) days before midnight of the current calendar day |
|  | Last 30 Days | shows clippings captured thirty (30) days before midnight of the current calendar day |
| Project is | Determined by availability plus "none" (which identifies clippings not associated with a project) | shows clippings associated with selected project; default selection for minor filter is "none" |
| Category is | Determined by availability plus "none" (which identifies clippings not associated with a category) | shows clippings associated with selected category; default selection for minor filter is "none" |
| Created in | All [default] | Shows entire catalog of clippings |
|  | Entourage* Excel* PowerPoint* Word* | shows app-specific clippings; app is only shown if clippings are available |
| Large items | None (disabled) | shows clippings in excess of 1 MB |
| Title contains | Edit control | queries against titles; executed dynamically as user types |
| Keyword contains | Edit control | queries against keywords; executed dynamically as user types |

As shown in the screenshots of FIGS. 3 and 5-7, the view filter mechanism comprises major and minor controls in the forms of drop down menus. Major filters will be attached to a minor filters, of which nearly all are drop down menus, as shown in the above table. Once a user selects a major filter, the minor control is updated to reflect associated filters as described above. Filters are executed on selection except for keywords, as described below.

If the user has selected either a project or category as the view filter, any clipping captured is automatically tagged as part of the selected project or category. This automatic tagging only occurs when a project or category is selected as a filter, and is turned off as soon as another major filter is selected.

If the user selects Keyword or Title as the major filter, the minor filter allows the user to enter in any number of characters and spaces up to 255 characters. Filtering is dynamically executed (as the user types). At present, the scrapbook 220 does not support filtering with wildcard characters (e.g., *, ?), but it is feasible to allow wildcard filtering.

Titles are initially derived as set forth in the following table:

| Source | Standard Title | Alternate Title |
|---|---|---|
| Excel, PPT, Word copy | [File Name] | New Clipping |
| Entourage mail, event, task, or note | New Clipping | New Clipping |
| Entourage Contact | New Clipping | New Clipping |
| File drag-drop, add | [File Name] | New Clipping |

When known, the standard title is rendered, otherwise, when information is not available for the standard title (e.g., on a new document that does not have a file name) the alternate title is used. Note that users may re-title clippings by entering an edit mode, or alternatively, by clicking on the title to edit it, e.g., after waiting a period of time set by the system. Changes may be undone while editing, until the change is committed. The title may be shown as a tooltip, e.g., on mouse over, such as to show the full name of the clipping if the title of the clipping is truncated.

With the metadata as criteria, the scrapbook 220 queries the database 222 and presents the appropriately returned clippings to the user. The scrapbook defaults to sorting in implicit reverse date order, but the user may sort otherwise. Once the desired set or subset of clippings is presented, users can select clippings and/or move clipping data out of the scrapbook by drag-drop, menu commands, or using the paste toolbar button. Items pasted are not removed from the scrapbook, but rather are maintained until the user expressly removes them, e.g., by clicking on the delete toolbar button or key as described below. Note that these actions can be applied to one or multiple selected clippings.

For one clipping, the user selects a clipping by clicking on it. For multiple clippings, the user may add further clippings by clicking on other clippings while either the command (or control) key or shift key depressed. For example, in a typical behavior (analogous to selecting files), if the user adds selections using the shift key, the clippings between the initial selection and the addition will be selected. If the user clicks on another clipping while the shift key is still down, a new range will be established with the previous selection as the beginning and the new click as the end. If the user adds individual selections using the command key, only the addition will be added; if the user clicks on a selected clipping while the command key is still down it will be removed from the group selection. The user may select all clippings, but if used while clippings are filtered and the user changes the filter, the selection is dismissed.

With respect to the add, paste and delete command buttons, e.g., 602, 603 and 604 of FIG. 6, respectively, users may click use these action buttons (which are toolbar buttons) that provide menus offering the following options; (note that unless something is selected the Action buttons are disabled):

| Button | Item | Pri | Action |
|---|---|---|---|
| Add | Add Selection | 1 | Adds current application selection to scrapbook |
| | Add File . . . | 2 | Brings up a dialog that allows the import of a file to the scrapbook |
| | Add from clipboard | 2 | Adds whatever is on the application clipboard to the scrapbook |
| | Always Add Copy | 2 | A toggle preference (off by default) that enables traditional Office Clipboard behavior |
| Paste | Paste | 1 | Pastes selection(s) to the active document |
| | Paste as Plain Text | 2 | Pastes selection to the active document as plain text flavor; this option is disabled if the selection contains a graphic scrap; only active if one clipping is selected |
| | Paste as Picture | 2 | Pastes selection to the active document as picture flavor (if made available by the source copy); only active if one clipping is selected |
| Delete | Delete Clipping | 1 | Permanently deletes the selected scrap(s); users are prompted with a warning dialog before this action is executed |
| | Delete Visible Clippings | 1 | Clears the scraps currently shown; users are prompted with a warning dialog before this action is executed |
| | Delete All Clippings | 1 | Clears the Scrapbook completely; users are prompted with a warning dialog before this action is executed |

Figure 10:
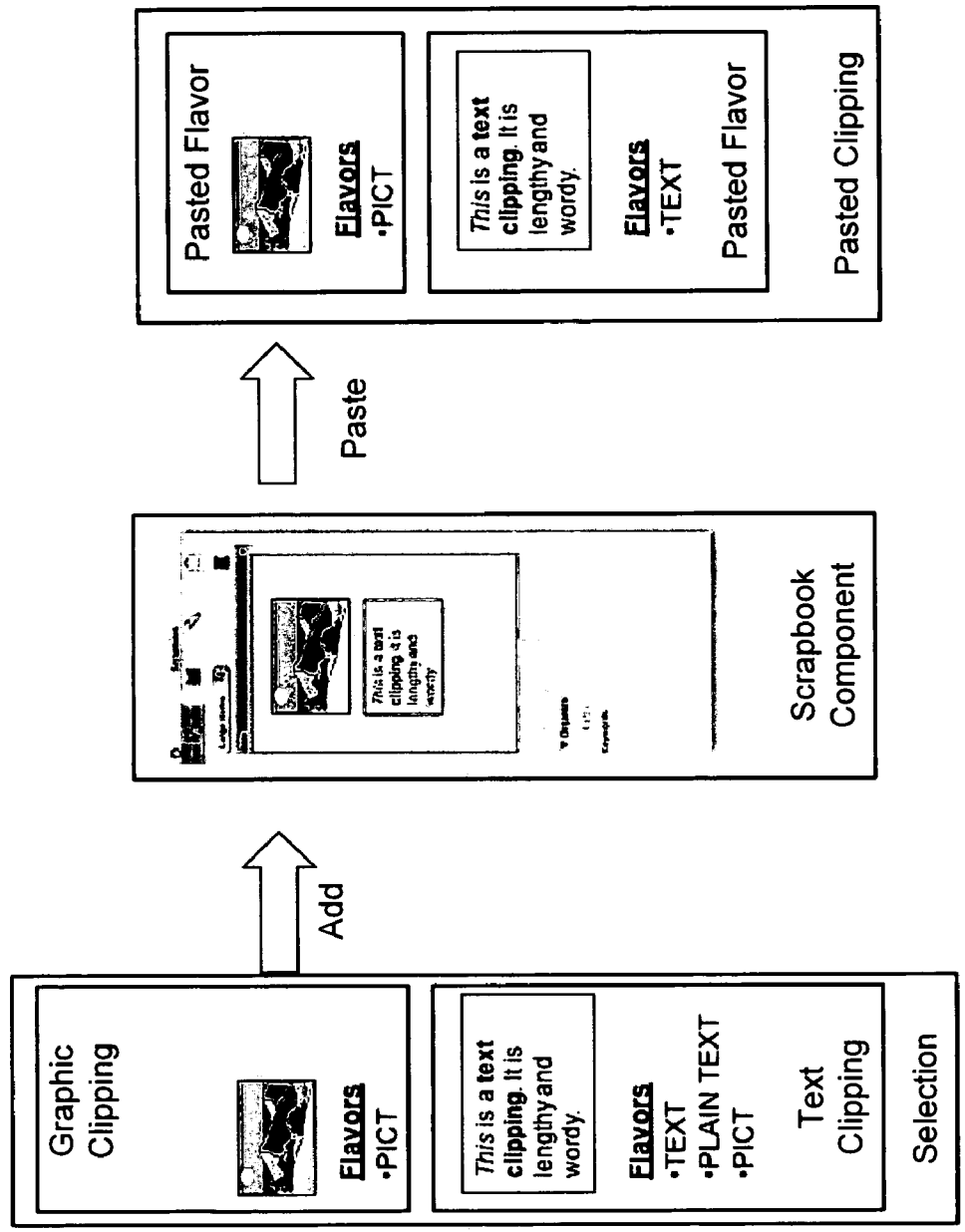
FIGS. 10 and 11 are representations of how flavors of data are pasted into a program's document in accordance with various aspects of the present invention.

By way of summary, the scrapbook is essentially a conduit that works in conjunction with the copy-paste action, but does not add or remove flavors. As a result, if the application that publishes a clipping to the clipboard does not include a flavor, the scrapbook does not create one. By way of example, FIG. 10 represents a user dragging a graphic and a text clipping to the Scrapbook. The graphic has one flavor (PICT) while the text clipping has three (text, plain text, and PICT). When the user switches to a program (e.g., Excel) and opens the scrapbook, then pastes the two clippings, the program respects the flavors and pastes accordingly, e.g., the first acceptable flavor. For the graphic, PICT is the first and only choice, and because Excel accepts PICTs, the graphic is pasted without issue. The text clipping has three flavors, and because Excel recognizes each flavor, it takes the first flavor (text) that includes formatting.

Figure 11:
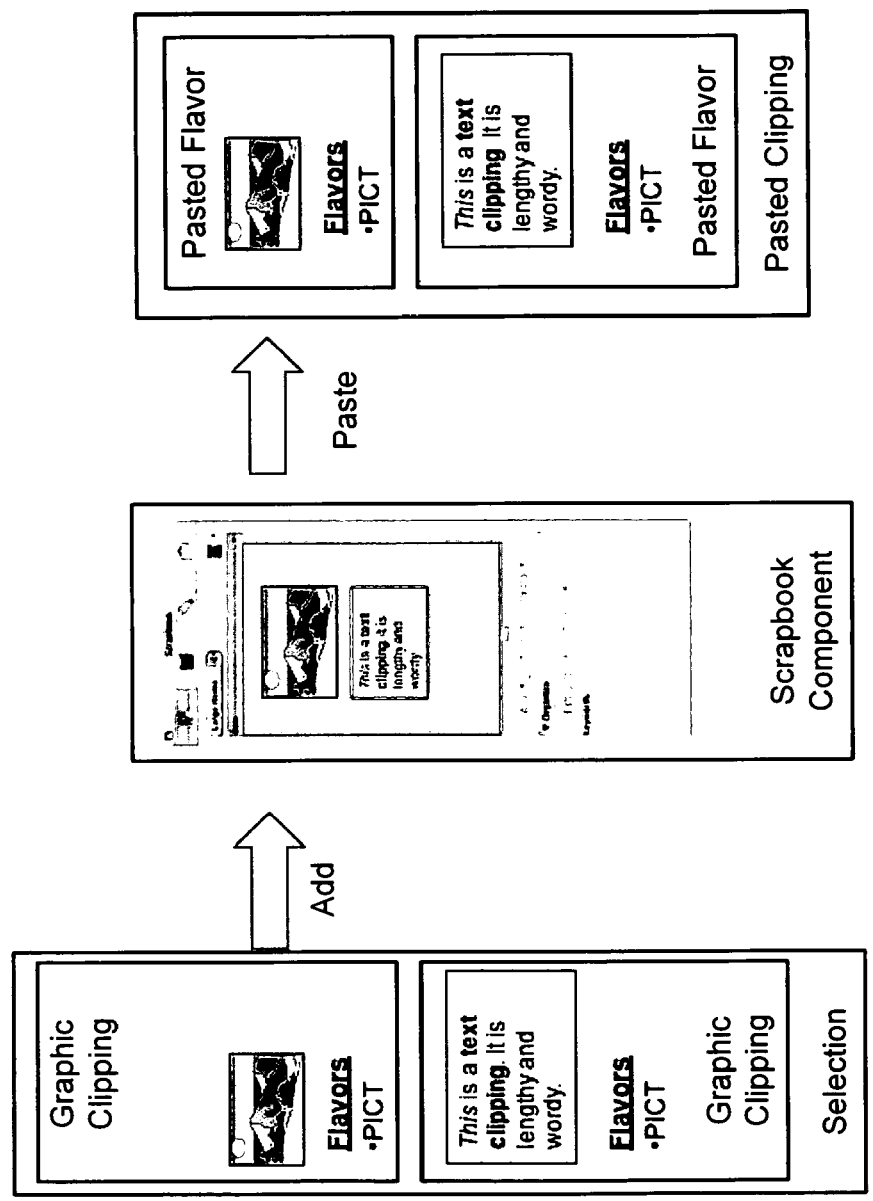

However, if the originating application does not include flavors, the scrapbook does not add them. By way further example, FIG. 11 represents the originating application publishing PICT flavors for both graphics and text. When added to the scrapbook, these flavors are maintained. However, when these are in turn pasted into a program, the text is pasted as a graphic (as PICT is the only available flavor). Note that in both example cases, this behavior is identical to copying and pasting from the originating application into the other program; this implementation of the scrapbook does not interfere with the traditional copy-paste model.

As can be seen from the foregoing detailed description, there is provided a method and system for persisting and managing computer program clippings. Clippings may be sorted and filtered to facilitate their later use. The method and system thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method for persisting data clippings categorized according to metadata associated with the clippings at the time of the creation of the clippings, the method comprising:

detecting that a user has selected one or more items from a source file that is stored on a memory storage device, the items is captured for inclusion in a clipping;

determining the format of each item included in the clipping, wherein at least one of the items includes a plurality of different formats where at least one of the plurality of different formats includes a greater amount of item formatting information than another format;

identifying a file path for the source file from which the clipping was selected, the file path to access additional items from the source file;

generating associated metadata about the selected clipping including the determined formats of each item in the selected clipping and an activatable hyperlink that, upon activation, is configured to access the source file using a stored file path linking the clipping to the source file;

for each item of the clipping:

determining that the items include a plurality of different formats, each different format including a greater or lesser amount of item formatting information in comparison to the other formats, such that a format with a greater or lesser amount of item formatting information than the format in which the item was initially captured for inclusion in the clipping is selectable by the user for inserting the item;

persisting the item in the determined plurality of different formats based on item type along with the associated metadata, the item is configured for insertion into software application fields in any of the plurality of formats; and inserting the items into one or more data fields of a software application in a format different than the format in which the item was initially captured for inclusion in the clipping, the format is selected by the application and based on at least some of the associated metadata, the selected format for each item selected from among the plurality of formats the item was persisted in;

receiving a user request to access one or more additional items from the source file;

based on the received user request, activating the hyperlink to access the one or more additional items in the source file using the hyperlink provided in the associated metadata; and providing a user interface having a plurality of user-selectable views, wherein at least one of the user-selectable views displays a thumbnail in a user-preferred format corresponding to at least one of the clippings, and wherein at least one of the user-selectable views displays a list view including text corresponding to the clippings.

2. The method of claim 1 wherein persisting the item in a plurality of formats based on item type along with the associated metadata includes persisting date information in association with at least some of the clippings.

3. The method of claim 1 wherein persisting the item in a plurality of formats based on item type along with the associated metadata includes persisting originating application information in association with at least some of the clippings.

4. The method of claim 1 wherein persisting the item in a plurality of formats based on item type along with the associated metadata includes persisting originating document information in association with at least some of the clippings.

5. The method of claim 1 wherein persisting the item in a plurality of formats based on item type along with the associated metadata includes persisting size information in association with at least some of the clippings.

6. The method of claim 1 wherein persisting the item in a plurality of formats based on item type along with the associated metadata includes persisting project information in association with at least some of the clippings.

7. The method of claim 1 wherein persisting the item in a plurality of formats based on item type along with the associated metadata includes persisting category information in association with at least some of the clippings.

8. The method of claim 1 wherein persisting the item in a plurality of formats based on item type along with the associated metadata includes persisting title information in association with at least some of the clippings.

9. The method of claim 1 wherein persisting the item in a plurality of formats based on item type along with the associated metadata includes persisting thumbnail information in association with at least some of the clippings.

10. The method of claim 1 wherein persisting the item includes persisting a plurality of data flavors for at least some of the items in the clippings.

11. The method of claim 1 further comprising, filtering to present clippings that are associated with a project, receiving a request to persist a new clipping, and automatically associating the new clipping with the project.

12. In a computing environment, a system comprising:

a processor;

a database;

a user interface configured to detect that a user has selected one or more items from a source file that are captured for inclusion in a clipping that is stored in a scrapbook;

a determination mechanism configured to determine the format of each item included in the clipping, wherein at least one of the items includes a plurality of different formats where at least one of the plurality of different formats includes a greater amount of item formatting information than another format;

an identifying mechanism configured to identify a file path for the source file from which the clipping was selected, the file path to access additional items from the source file;

a metadata generating mechanism configured to generate associated metadata about the selected clipping including the determined formats of each item in the selected clipping and an activatable hyperlink that, upon activation, is configured to access the source file using a stored file path linking the clipping to the source file;

a scrapbook mechanism coupled to the database to enable, for each item of the clipping:

determining that the items include a plurality of different formats, each different format including a greater or lesser amount of item formatting information in comparison to the other formats, such that a format with a greater or lesser amount of item formatting information than the format in which the item was initially captured for inclusion in the clipping is selectable by the user for inserting the item;

persisting the item in the determined plurality of different formats based on item type along with the associated metadata, the item is configured for insertion into software application fields in any of the plurality of formats; and inserting the items persisted in the database into one or more data fields of a software application in a format different than the format in which the item was initially captured for inclusion in the clipping, the format is selected by the application based on at least some of the associated metadata, the selected format for each item selected from among the plurality of formats the item was persisted in;

a user request receiving mechanism configured to receive a user request to access one or more additional items from the source file;

an item accessing mechanism configured, based on the received user request, to activate the hyperlink to access the one or more additional items in the source file using the hyperlink provided in the associated metadata; and providing a user interface having a plurality of user-selectable views, wherein at least one of the user-selectable views displays a thumbnail corresponding to at least one of the clippings, and wherein at least one of the user-selectable views displays a list view including text corresponding to the clippings.

13. The system of claim 12 further comprising:
filtering the available clippings to present a subset of clippings that are associated with a project; and
automatically associating a new clipping with the project upon receiving a request to persist a new clipping.

14. The system of claim 12 further comprising:
filtering the available clippings to present a subset of clippings that are associated with a category; and
automatically associating a new clipping with the category upon receiving a request to persist a new clipping.

15. The system of claim 12 further comprising a filter mechanism including a major field and a minor field.

16. A computer program product for implementing a method for persisting data clippings categorized according to metadata associated with the clippings at the time of the creation of the clippings, the computer program product comprising one or more computer-readable storage media having thereon computer-executable instructions that, when executed by one or more processors of a computing system, cause the computing system to perform the method, the method comprising:
detecting that a user has selected one or more items from a source file that are captured for inclusion in a clipping;
determining the format of each item included in the clipping, wherein at least one of the items includes a plurality of different formats where at least one of the plurality of different formats includes a greater amount of item formatting information than another format;
identifying a file path for the source file from which the clipping was selected, the file path to access additional items from the source file;
generating associated metadata about the selected clipping including the determined formats of each item in the selected clipping and an activatable hyperlink that, upon activation, is configured to access the source file using a stored file path linking the clipping to the source file;
receiving at least one filtering criterion;
filtering each item of the clipping into a filtered subset based on the filtering criterion or criteria and the associated metadata; for each item of the clipping:
determining that the items include a plurality of different formats, each different format including a greater or lesser amount of item formatting information in comparison to the other formats, such that a format with a greater or lesser amount of item formatting information than the format in which the item was initially captured for inclusion in the clipping is selectable by the user for inserting the item;
persisting the item in the determined plurality of different formats based on item type along with the associated metadata, the item is configured for insertion into software application fields in any of the plurality of formats; and
inserting the items into one or more data fields of a software application in a format different than the format in which the item was initially captured for inclusion in the clipping, the format is selected by the application and based on at least some of the associated metadata, the selected format for each item selected from among the plurality of formats the item was persisted in;

receiving a user request to access one or more additional items from the source file;

based on the received user request, activating the hyperlink to access the one or more additional items in the source file using the hyperlinik provided in the associated metadata;

providing a user interface having a plurality of user-selectable views, wherein at least one of the user-selectable views displays a thumbnail corresponding to at least one of the clippings, and wherein at least one of the user-selectable views displays a list view including text corresponding to the clippings.

17. The computer-readable storage media of claim 16 wherein persisting the item includes persisting a plurality of data flavors for at least some of the items in the clippings.

18. The computer-readable storage media of claim 16 wherein filtering the clippings into a filtered subset comprises filtering to present clippings that are associated with a project, and further comprising, receiving a request to persist a new clipping, and automatically associating the new clipping with the project.

19. The computer-readable storage media of claim 16 wherein filtering the clippings into a filtered subset comprises filtering to present clippings that are associated with a category, and further comprising, receiving a request to persist a new clipping, and automatically associating the new clipping with the category.

20. The computer-readable storage media of claim 16 wherein receiving at least one filtering criterion comprises receiving at least one filtering criterion from among types of criteria in a set containing: date information, originating application information, originating document information, size information, project information, category information, and title information.

21. The method of claim 1, further comprising determining that the source file linked by the hyperlink is no longer accessible using the hyperlinik's file path.

22. The method of claim 21, further comprising preventing the hyperlinik from being shown within the software application despite an indication in the metadata that the hyperlinik is to be shown in the software application.

23. The method of claim 1, wherein the thumbnail shows the format with the greatest amount of item formatting information for the clipping item.

24. The method of claim 1, wherein the thumbnail displays a text-only version of the clipping item, such that graphical items are not displayed.

25. The method of claim 1, wherein a badge indicating at least one of the owner and the originating program of the clipping item is stamped on the thumbnail.

26. The system of claim 12, wherein each selected clipping item is automatically added to a clipping scrapbook.

27. The method of claim 14, wherein, upon association with the category, the new clipping inherits one or more portions of metadata corresponding to the category.

28. The method of claim 1, wherein the clipping includes one or more data files.

29. The method of claim 28, further comprising:
   determining that at least one of the one or more data files is of a non-supported file type; and
   rejecting the at least one data file of the non-supported file type.

30. The method of claim 1, further comprising displaying at least one clipping in an application window, the clipping including a representative thumbnail image and at least a portion of the generated associated metadata.

31. The method of claim 30, wherein the clippings displayed in the application window are ordered based on associated metadata.

32. The method of claim 30, further comprising filtering to restrict the clippings that are presented to a subset of those available for access.

33. The method of claim 32, further comprising providing a user interface having an input mechanism for receiving user input corresponding to at least one filtering criterion.

* * * * *